US010615549B2

(12) United States Patent
Westbury

(10) Patent No.: US 10,615,549 B2
(45) Date of Patent: Apr. 7, 2020

(54) CONFIGURED PORT-WIDTH INDICATION FOR GANGED-STYLE CONNECTORS

(71) Applicant: Seagate Technology LLC, Cupertino, CA (US)

(72) Inventor: Alan John Westbury, Hants (GB)

(73) Assignee: Seagate Technology LLC, Cupertino, CA (US)

( * ) Notice: Subject to any disclaimer, the term of this patent is extended or adjusted under 35 U.S.C. 154(b) by 348 days.

(21) Appl. No.: 15/255,066

(22) Filed: Sep. 1, 2016

(65) Prior Publication Data
US 2018/0062328 A1 Mar. 1, 2018

(51) Int. Cl.
H01R 13/717 (2006.01)
H01R 24/60 (2011.01)
G06F 13/42 (2006.01)
G06F 13/40 (2006.01)
H01R 12/72 (2011.01)
H01R 107/00 (2006.01)

(52) U.S. Cl.
CPC ..... H01R 13/7175 (2013.01); G06F 13/4022 (2013.01); G06F 13/4282 (2013.01); H01R 12/722 (2013.01); H01R 13/7172 (2013.01); H01R 24/60 (2013.01); *H01R 2107/00* (2013.01)

(58) Field of Classification Search
None
See application file for complete search history.

(56) References Cited

U.S. PATENT DOCUMENTS

| 4,686,506 A * | 8/1987 | Farago | G06F 13/38 341/100 |
|---|---|---|---|
| 5,876,240 A | 3/1999 | Derstine et al. | |
| 6,820,156 B1 | 11/2004 | Miller et al. | |
| 7,685,329 B1 * | 3/2010 | Sivertsen | G06F 13/4068 710/15 |
| 7,930,462 B2 * | 4/2011 | Wang | G06Q 20/20 370/351 |
| 8,419,212 B2 * | 4/2013 | MacDougall | H01R 12/712 362/227 |
| 8,760,312 B2 | 6/2014 | Hua et al. | |
| 2004/0003155 A1 | 1/2004 | Krontz | |
| 2012/0005392 A1 * | 1/2012 | Yagi | G06F 13/409 710/313 |
| 2015/0378116 A1 * | 12/2015 | Zbinden | G02B 6/3879 385/89 |
| 2016/0147001 A1 * | 5/2016 | Herloski | G02B 6/0008 347/238 |

\* cited by examiner

Primary Examiner — Idriss N Alrobaye
Assistant Examiner — Dayton Lewis-Taylor
(74) Attorney, Agent, or Firm — Taylor English Duma LLP

(57) ABSTRACT

System, methods, and apparatuses for indicating the configured port width for ganged-style data connectors. An exemplary apparatus comprises a plurality of connectors supporting data connections and a plurality of visual indicators. The plurality of connectors are capable of being configured with two or more of the plurality of connectors ganged together to provide increased data width connections. Each or the visual indicators is associated with one of the plurality of connectors. An electrical circuit drives the plurality of visual indicators and is configured to control the visual indicators to visually indicate a configured port width for each data connection supported by the connectors, including those formed by ganging together two or more of the connectors.

18 Claims, 6 Drawing Sheets

CONFIGURED PORT-WIDTH INDICATION FOR GANGED-STYLE CONNECTORS

BRIEF SUMMARY

The present disclosure relates to technologies for indicating the configured port width for ganged-style data connectors. According to some embodiments, a system comprises a plurality of connectors supporting data connections and a plurality of visual indicators. The plurality of connectors are capable of being configured with two or more of the plurality of connectors ganged together to provide increased data width connections. Each visual indicator is associated with one of the plurality of connectors. An electrical circuit drives the plurality of visual indicators and is configured to control the visual indicators to visually indicate a configured port width for each data connection supported by the connectors, including those formed by ganging together two or more of the connectors.

According to further embodiments, a method of indicating configured port widths for a plurality of connectors capable of being ganged-together to form increased data width connections comprises the steps of reading interface configuration parameters from a memory; determining based on the interface configuration parameters whether two or more of the plurality of connectors are ganged together to provide an increased data width connection; and if it is determined that the two or more of the plurality of connectors are ganged together, drive a plurality of visual indicators associated with the two or more of the plurality of connectors to indicate that the two or more of the plurality of connectors are ganged together.

According to further embodiments, a receptacle assembly comprises a plurality of connectors, each of the plurality of connectors supporting multi-lane data connections. The assembly further comprises a plurality of visual indicators, each visual indicator associated with one of the plurality of connectors. The assembly is configured so that two or more adjacent connectors may be ganged together to provide increased data width connections, and the visual indicators associated with the two or more adjacent connectors are configured to indicate a configured port width for the multi-lane data connection formed by the two or more adjacent connectors being ganged together.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
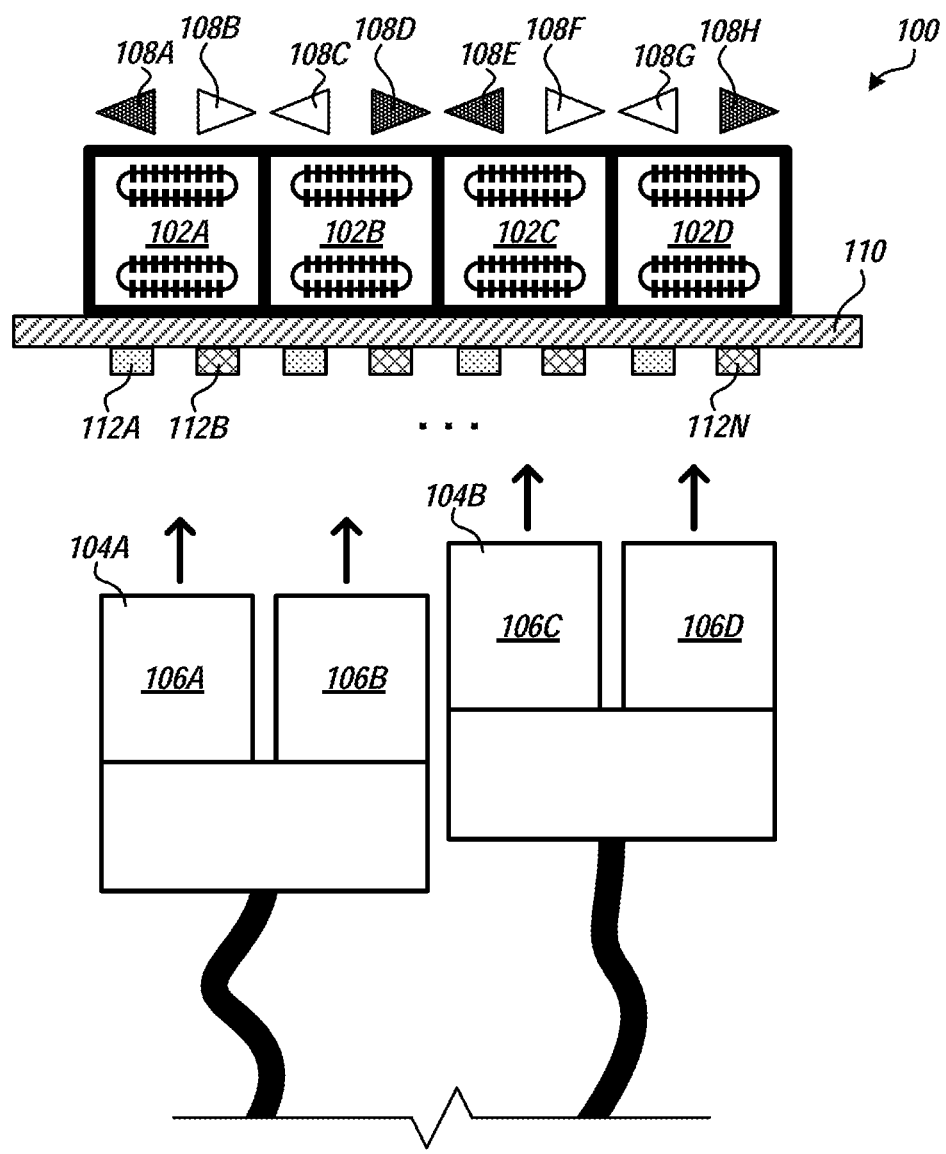
FIGS. 1A and 1B are block diagrams showing an illustrative receptacle assembly comprising multiple data connectors and associated visual indicators, according to embodiments described herein.

The following detailed description is directed to technologies for indicating the configured port width for ganged-style data connectors. Many data connectors for modern computing devices and associated peripherals implement serial interfaces supporting high-speed communication rates. Serial interfaces have an advantage over parallel interfaces at high speeds in that the timing information is embedded in the 1-bit wide signal and latency between parallel data lines does not limit transmission rates. For example, version 3.0 of the Peripheral Component Interconnect Express (PCIe) interface specification provides for transmission speeds of up to 8 GT/s.

In addition, multiple serial transmission paths, referred to as "lanes," may be combined to increase the data communication rate. For example, a PCIe lane consists of two differential pairs of signals, one for sending and the other for receiving, allowing for simultaneous bi-directional communication. A PCIe interface allows the use of multiple lanes for communication between a host computer and the attached device. Some relatively low-bandwidth devices, such as network interface cards ("NICs"), sound cards, and the like, may utilize just one lane of a PCIe interface (designated "×1"). Other devices, such as hard disk drives ("HDDs"), solid-state drives ("SSDs"), storage controllers, graphics cards, and the like may utilize 4, 8, or 16 lanes (designated 4×, 8×, and 16×, respectively) in order to communicate with the host at higher data rates.

PCIe interfaces may also be utilized for connecting external devices to a host device. Until revision 3.0 of the of the PCIe specification, these external connections were limited to the number of lanes supported by an individual connector. Starting with revision 3.0 of the specification, connectors may be ganged together to provide more lanes, thus increasing the data width for the connection. For example, a single SFF-8644 connector (also referred to as a "mini-SAS HD" connector) provides 4 lanes for bi-directional serial data (referred to herein as a "4×PCIe port"). However, the PCIe 3.0 specification provides that multi-connector ports can be configured, allowing for the creation of 8×, 12×, or 16×PCIe ports by utilizing 2, 3, or 4 adjacent SFF-8644 connectors ganged together.

However, the PCIe interface protocol does not provide for the ganging together of PCIe connectors in a dynamic fashion, such as that available with ganged Serial Attached SCSI ("SAS") connections. The port width configuration of an external PCIe interface must be performed statically, and once the port width configuration has been set, the external cabling topology must match the preset configuration, otherwise there is a likelihood that the ports will not initialize. Therefore, there is a need to display the configured port width of ganged, external PCIe connectors to system personnel performing the connections in order reduce the risk of cabling errors.

According to embodiments presented herein, a novel approach for displaying the port width configuration for external PCIe ports formed from multiple, ganged connectors may be implemented. In some embodiments, "ganging" is understood to mean arranging together, coordinating together, or grouping together. To accomplish this, each connector has a number of associated visual indicators utilized to indicate configured port width. FIG. 1A shows an illustrative receptacle assembly 100 comprising multiple, female data connectors 102A-102D (referred to herein generally as connectors 102), according to embodiments. The connectors 102A-102D may represent mini-multilane connectors as defined by the SFF-8614 and SFF-8644 specifications, also referred to as mini-SAS HD connectors, each supporting four-lane (4×) PCIe data connections. The connectors 102A-102D are configured to receive complementary male connectors 106A-106D on plugs, such as plugs 104A and 104B (referred to herein generally as plugs 104). As is shown, a single plug, such as plug 104A, may comprise multiple male connectors, such as connectors 106A and 106B.

According to embodiments, the receptacle assembly 100 further includes multiple visual indicators 108A-108H (referred to herein generally as visual indicators 108) utilized to display the configured port width of the PCIe ports formed by the connectors 102A-102D. In some embodiments, two visual indicators 108 are associated with each connector 102 and positioned at either side of the associated connector. For example, as shown in FIG. 1A, the visual indicators 108A and 108B may be associated with connector 102A, the visual indicators 108C and 108D associated with connector 102B, and so on.

Figure 1B:
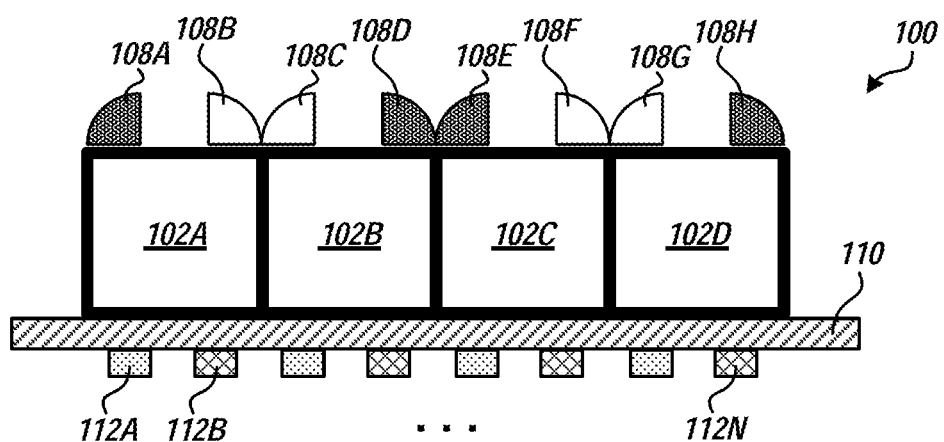

According to some embodiments, the visual indicators, such as visual indicators 108A and 108B, associated with a particular connector, such as connector 102A, may comprise "corner markers" shaped with opposing shapes such as to visually encompass the connector. For example, the pairs of visual indicators, such as visual indicators 108A and 108B, may be opposing triangular shapes or "arrows," according to some embodiments. In other embodiments, the pairs of visual indicators each pair of visual indicators 108 may be opposing arcuate shapes, as shown in FIG. 1B. In further embodiments, the visual indicators 108 may be positioned above the associated connectors 102 at opposing top corners of the connector. In other embodiments, the visual indicators 108 may be positioned below the associated connectors 102 (not shown).

The port width of the data ports formed by the connectors 102A-102D as configured are displayed by setting the state of the visual indicators 108A-108H associated with the connectors. According to embodiments, turning on or off a visual indicator 108 may involve illuminating, changing the color of, or otherwise changing the visual character of the visual indicator. For example, an 8×PCIe port may be configured by ganging together adjacent connectors 102A and 102B. This configuration may be indicated by turning on visual indicator 108A associated with connector 102A and visual indicator 108D associated with connector 102B, while leaving visual indicators 108B and 108C off. The visual indicators 108A-108D would therefore communicate that the ganged adjacent connectors 102A and 102B were configured to receive the plug 104A for an 8× data connection from an external device to the host.

Figure 2A:
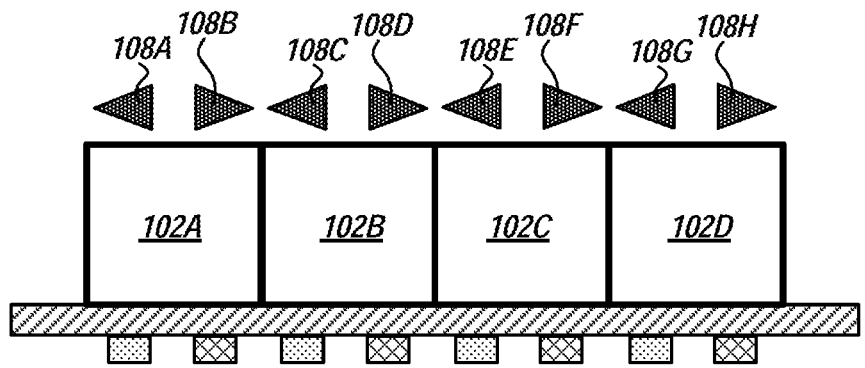
FIGS. 2A-2C are block diagrams showing the illustrative receptacle assembly and visual indicators in various states indicating different port widths for gangs of connectors, according to embodiments described herein.
Figure 2B:
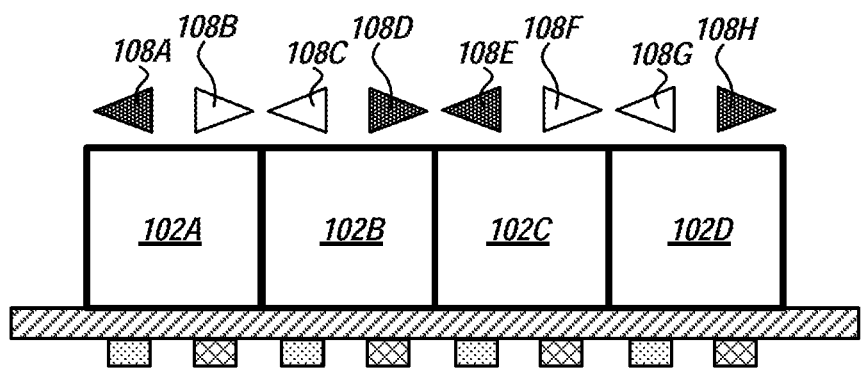
Figure 2C:
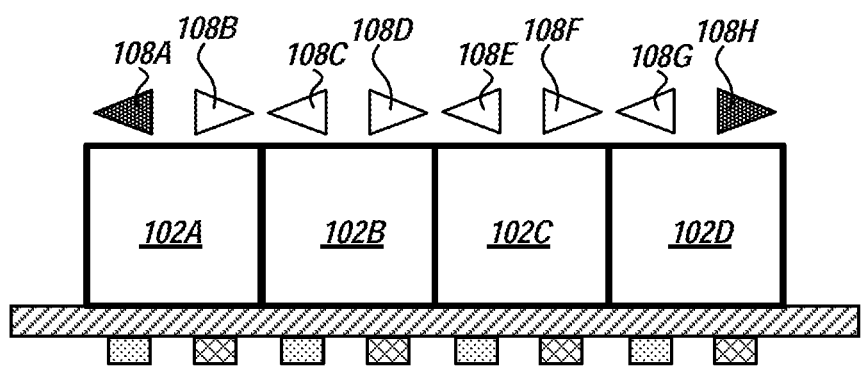

FIGS. 2A-2C show the state of the visual indicators 108A-108H for the connectors 102A-102D configured for four 4×PCIe ports, two 8×PCIe ports, and one 16× port, respectively, according to further embodiments. In each case, the visual indicators 108 encompassing adjacent, ganged connectors 102 are turned on to indicate the configured port width of the respective ports. For example, as shown in FIG. 2B, the visual indicators 108A and 108E positioned in the first left hand corner, and the visual indicators 108D and 108H positioned in the last right corner of each gang of connectors 102A/102B and 102C/102D, are turned on to indicate the port width of the configured port(s). It will be appreciated that other schemes for the visual indicators 108A-108H will be possible utilizing the embodiments described herein to indicate port configurations not shown, such as the connectors 102A, 102B, and 102C ganged together for a single 12× port and the connector 102D configured for a 4× port. In some embodiments, mismatches of the connected plugs 104 to the configured port width of the PCIe ports formed by the ganged connectors 102A-102D may be indicated by flashing patterns on the associated visual indicators 108A-108H.

Figure 3:
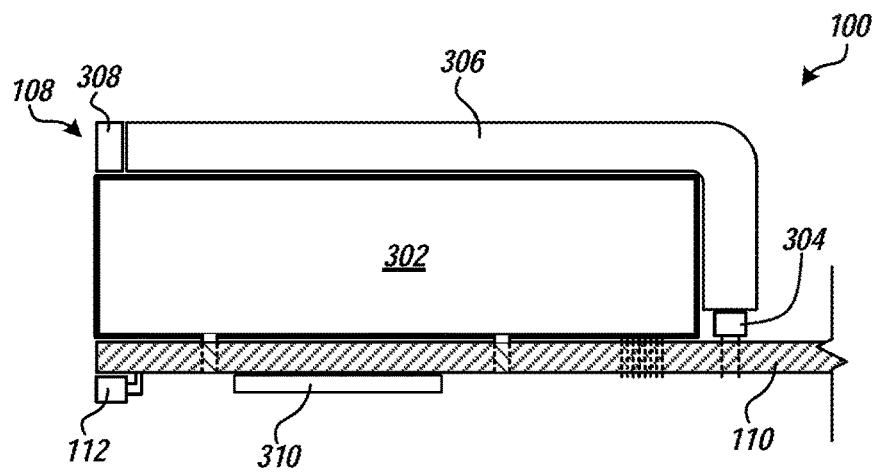
FIG. 3 is a side view of an illustrative receptacle assembly showing additional aspects and components, according to further embodiments described herein.

According to some embodiments, the receptacle assembly 100 may include a printed circuit board ("PCB") 110, as further shown in FIG. 1. The receptacle assembly may also include other indicators 112A-112N (referred to herein generally as other indicators 112) associated with the data connectors 102A-102D for indicating status, activity, and the like of the implemented data connections. As shown in FIG. 3, the receptacle assembly 100 may comprise a receptacle cage 302 comprising the connectors 102A-102D. The receptacle cage 302 may be mechanically and/or electrically connected to the top of the PCB 110. Each visual indicator 108 may comprise a light-emitting diode ("LED") 304 or other visual device connected to the PCB 110. In some embodiments, the LEDs 304 for the visual indicators 108 may be mounted on the bottom of the PCB in proximity to the associated connector 102 (not shown).

Figure 4:
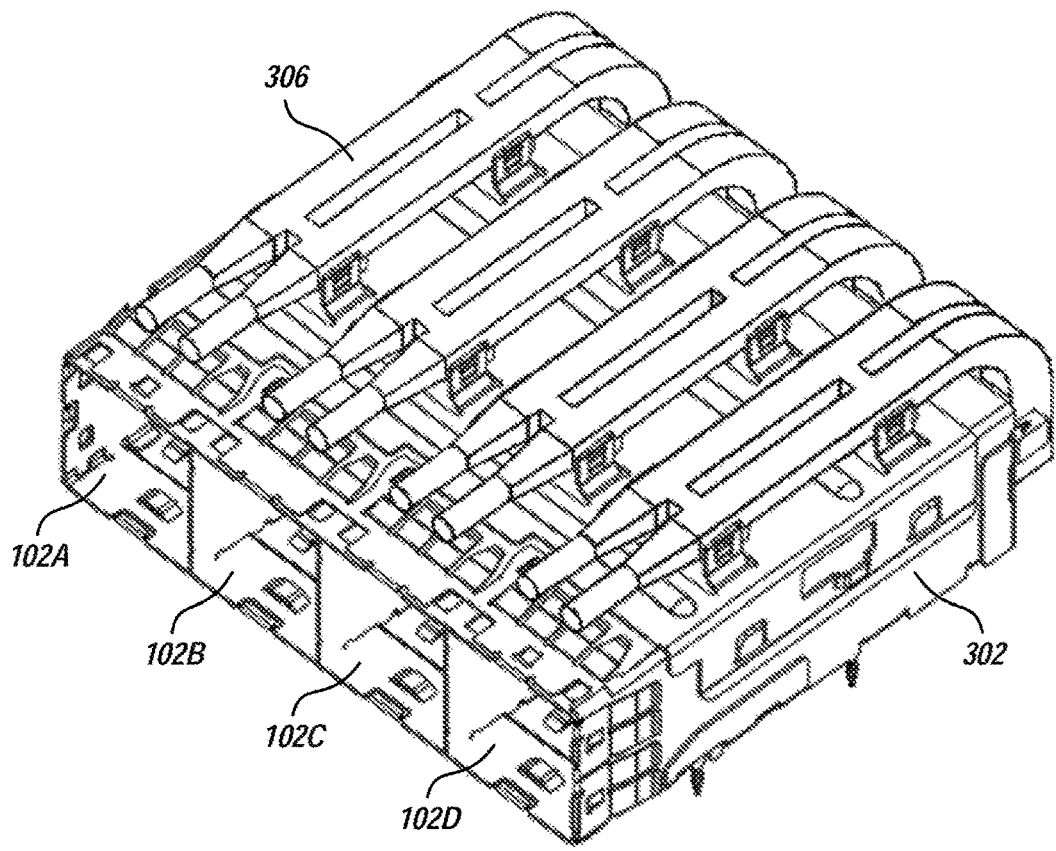
FIG. 4 is a perspective view of an illustrative receptacle assembly having removable light pipes, according to further embodiments described herein.

In other embodiments, the LEDs 304 for the visual indicators 108 may be mounted on top of the PCB 110 behind the receptacle cage 302, with the light of the LEDs brought to the front of the associated connectors 102 by means of light pipes 306. This may be the case when other indicators 112 are connected to the PCB 110 below the connectors 102A-102D. The use of light pipes 306 for the visual indicators 108 may provide a more cost-effective implementation in that the light pipes may be removed when adapting the receptacle assembly for SAS connectivity, which does not require indication of configured port width for the ports. FIG. 4 shows a perspective view of the receptacle cage 302 with detachable light pipes 306, according to some embodiments.

Returning to FIG. 3, diffusers 308 may be added to the front of the LEDs 304 or at the end of the light pipes 306 to adjust the shape and/or color of the visual indicators 108 shown at the connectors 102, according to some embodiments. The shape or profile of the diffusers 308 and/or light pipes 306 may be modified to make alternate shapes to the opposing triangular or arcuate shapes described herein and shown in FIGS. 1A, 1B, and 2A-2C. The PCB 110 may further include an LED driver circuit 310, such as a microcontroller ("MCU") circuit, utilized to drive the LEDs 304 for the visual indicators 108 according to the configured port widths, as will be described below.

Figure 5:
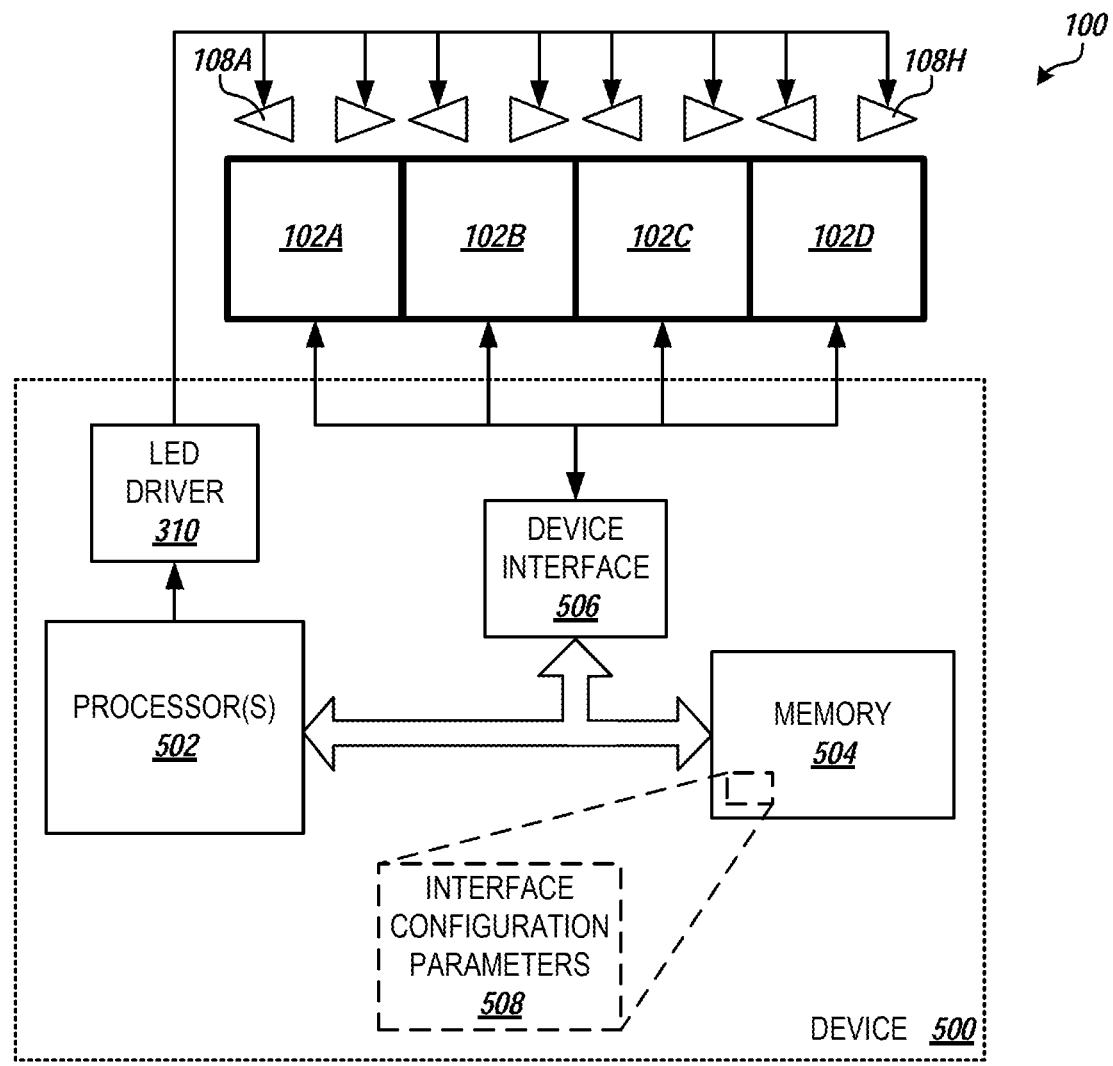
FIG. 5 is a block diagram showing an illustrative environment for indicating the configured port width for ganged-style data connectors, according to embodiments described herein.

FIG. 5 and the following description are intended to provide a general description of a suitable environment in which the embodiments described herein may be implemented. In particular, FIG. 5 shows an illustrative device 500, such as a storage controller, storage device, server computer, personal computer ("PC"), or the like. The device 500 includes one or more processors 502, such as multi-core microprocessors, microcontrollers, field-programmable gate arrays ("FPGAs"), application-specific integrated circuits (ASICs), or the like for performing initialization and processing on the device. The device 500 may further include a computer-readable storage medium or "memory" 504 for storing processor-executable instructions, data structures and other information. The memory 504 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing initialization of the device, including establishing connections to any external devices. According to some embodiments, the memory 504 may store processor-executable instructions that, when executed by the processor(s) 502, perform the routine 600 for indicating the configured port width for ganged-style data connectors in the device, as described herein.

In addition to the memory 504, the environment may include other computer-readable media storing program modules, data structures, and other data described herein for storing data in the device 500 for indicating the configured port width for ganged-style data connectors. It will be appreciated by those skilled in the art that computer-readable media can be any available media that may be accessed by the device 500 or other computing system for the non-transitory storage of information. Computer-readable media includes volatile and non-volatile, removable and non-removable storage media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to embodiments, the device 500 implements a device interface 506. The device interface 506 comprises components, circuitry, and software for creating data connections between the device 500 and other computing devices. For example, the device interface 506 of a storage controller device 500 may allow the connection of one or more external host devices, according to some embodiments. In other embodiments, the device interface 506 may connect a host device to internal and external peripheral devices, such as hard disk drives ("HDDs"), solid-state drives ("SSDs"), hybrid drives ("SHSDs"), and other storage devices; network interface cards ("NICs"); graphics adapters ("GPUs"); standard I/O devices; and the like. For example, the device interface 506 may comprise a high-speed serial computer expansion bus according to the PCIe standard. In addition, the device interface 506 may include a SAS interface, a SATA interface, a PCI bus interface, and/or the like.

External components and devices may be electrically connected to the device interface 506 through a receptacle assembly 100, such as that described herein. For example, external storage devices may be connected to the PCIe bus through one or more mini-SAS HD connectors 102A-102D ganged together to increase the data width of the connection. According to some embodiments, upon startup of the device 500, the processor(s) 502 may initialize the device interface 506 based on interface configuration parameters 508 contained in the memory 504. The interface configuration parameters 508 may include parameters indicating the groups or "gangs" of connectors 102A-102D of the receptacle assembly 100 that are ganged together to provide increased data width connections. For example, the interface configuration parameters 508 may include parameters indicating that adjacent connectors 102A and 102B are ganged together to provide one 8×PCIe port, while adjacent connectors 102C and 102D are ganged together to provide another 8×PCIe port.

According to embodiments, the processor(s) 502 drive the visual indicators 108A-108H for the receptacle assembly 100 to indicate the configured port width of the data ports formed by the configuration of the connectors 102A-102D, as further disclosed herein. In some embodiments, the processor(s) 502 may set the state of the individual visual indicators 108A-108H through the LED driver circuit 310. The LED driver circuit 310 includes components, circuitry, and software for modifying and maintaining the state of the visual indicators 108A-108H. The LED driver circuit 310 may comprise components and circuitry on the device 500, components and circuitry on a PCB 110 comprising the receptacle assembly 100, or a combination of the two. For example, for the configuration of the connectors 102A-102D forming two 8×PCIe ports described above, the processor(s) 502 may utilize the LED driver circuit 310 to set the state of the visual indicators 108A-108H as shown in FIG. 2B.

It will be appreciated that the structure and/or functionality of the device 500 may be different that that illustrated in FIG. 5 and described herein. For example, the processor(s) 502, memory 504, device interface 506, and other components and circuitry of the device 500 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the device 500 may not include all of the components shown in FIG. 5, may include other components that are not explicitly shown in FIG. 5 or may utilize an architecture completely different than that shown in FIG. 5.

Figure 6:
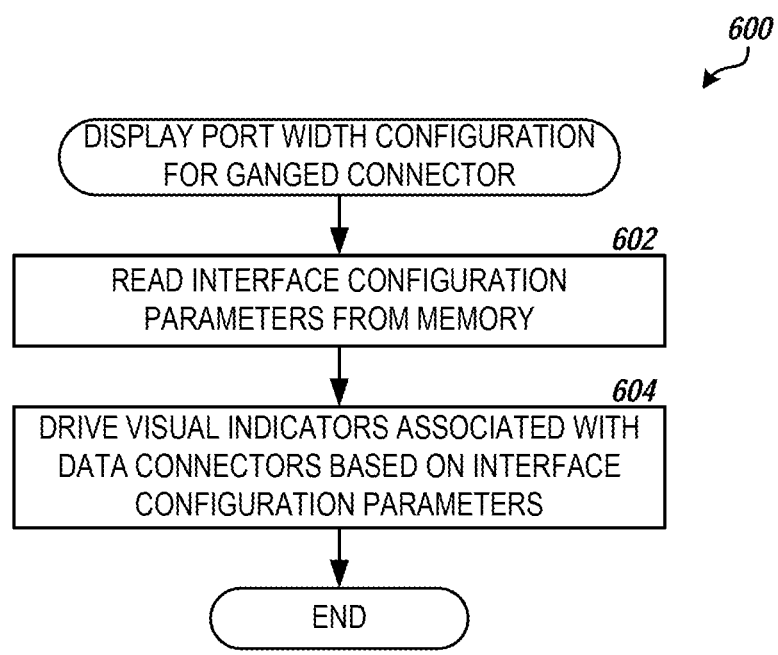
FIG. 6 is a flow diagram showing one routine for indicating the configured port width for ganged-style data connectors in a device, according to embodiments described herein.

FIG. 6 illustrates one routine 600 for indicating the configured port width for ganged-style data connectors in a device 500, as described herein. According to some embodiments, the routine 600 may be performed by the processor(s) 502 of the device 500 upon initialization of the device interface 506. In further embodiments, the routine 600 may be performed by external processors and/or components connected to the device 500 or by some other combination of modules, processors, and devices.

The routine 600 begins at step 602, where the processor(s) 502 read the interface configuration parameters 508 from the memory 504 or other storage location available to the device 500. The processor(s) 502 may then utilize the interface configuration parameters 508 to initialize the device interface 506, including ganging together two or more of the attached connectors 102A-102D to form wider ports.

From step 602, the routine 600 proceeds to step 604, where the processor(s) 502 drive the visual indicators 108A-108H associated with the data connectors 102A-102D to indicate the configured port widths based on the interface configuration parameters 508. According to some embodiments, if it is determined that two or more of the connectors 102 are ganged together to form a wide port, the processor(s) 502 may utilize the LED driver circuit 310 to set the state of the visual indicators 108 associated with the two or more connectors to indicate the configured port width. For example, upon initialization of the device interface 506, the processor(s) 502 may set the state of the visual indicators 108A-108H for the connectors 102A-102D to indicate configurations of four 4×PCIe ports, two 8×PCIe ports, or one 16×PCIe port, as shown in FIGS. 2A-2C, respectively. From step 604, the routine 600 ends.

Based on the foregoing, it will be appreciated that technologies for indicating the configured port width for ganged-style data connectors are presented herein. While the figures and description of the instant disclosure refer to SFF-8644 or min-SAS HD connectors, it will be appreciated that the embodiments described herein may be applied equally effectively to other connector styles. In addition, while the embodiments described herein reference PCIe data interfaces, it will be further appreciated that the visual port-width indication scheme described herein may be utilized with any data interface supporting ganged connectors wherein the configuration may be statically configured. Further, the visual port-width indication scheme may be utilized with data interfaces that implement dynamic port width configuration, such as SAS interfaces, in order to indicate the currently negotiated port configuration for verification by installation and service personnel. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A system comprising:
    a plurality of connectors supporting an interface protocol allowing two or more adjacent connectors to be ganged together to form a single, increased data width port;
    a plurality of visual indicators, each associated with one of the plurality of connectors;
    an electrical circuit for driving the plurality of visual indicators, the electrical circuit controlling the visual indicators associated with the plurality of connectors to visually indicate which two or more adjacent connectors of the plurality of connectors are ganged together to form the single, increased data width port; and
    a processor configured to:
        read interface configuration parameters from a memory of the system;
        determine based on the interface configuration parameters whether two or more adjacent connectors of the plurality of connectors are ganged together to form a single, increased data width port; and if it is determined that two or more adjacent connectors are ganged together to form a single, increased data width port, drive the visual indicators associated with the two or more adjacent connectors through the electrical circuit to indicate that the two or more adjacent connectors are ganged together to form the single, increased data width port.

2. The system of claim 1, wherein the visual indicators associated with the two or more adjacent connectors comprise two visual indicators positioned on either side of each connector, and wherein indicating that the two or more adjacent connectors are ganged together to form the single, increased data width port comprises illuminating the visual indicators visually encompassing the two or more adjacent connectors.

3. The system of claim 1, wherein the plurality of visual indicators comprise two visual indicators of opposing triangular shape associated with each of the plurality of connectors and located at opposing top corners of the associated connector.

4. The system of claim 1, wherein each of the plurality of visual indicators further comprise a light-emitting diode ("LED") and a light pipe configured to transmit light from the LED to a diffuser positioned proximate to a front of the associated connector.

5. The system of claim 1, wherein the interface protocol utilizes a multi-lane data connection.

6. The system of claim 1, wherein each of the plurality of connectors comprises a Mini Serial Attached SCSI, High Density ("mini-SAS HD") connector and the interface protocol comprises the Peripheral Component Interconnect Express ("PCIe") interface protocol.

7. The system of claim 1, wherein the system is configured to provide data connections between a host device and one or more storage devices.

8. A method of indicating which of a plurality of connectors of a data interface are ganged together to form a single, increased data width port, the method comprising steps of:
    reading interface configuration parameters from a memory;
    determining based on the interface configuration parameters whether two or more of the plurality of connectors are ganged together to form a single, increased data width port; and if it is determined that two or more of the plurality of connectors are ganged together to form a single, increased data width port, driving a plurality of indicators associated with the two or more of the plurality of connectors to indicate that the two or more of the plurality of connectors are ganged together to form the single, increased data width port.

9. The method of claim 8, wherein each of the plurality of connectors is associated with two of the plurality of indicators that are visual indicators positioned on either side of the associated connector, and wherein indicating that the two or more of the plurality of connectors are ganged together comprises illuminating the visual indicators visually encompassing the two or more of the plurality of connectors.

10. The method of claim 9, wherein the two visual indicators associated with each connector comprise two visual indicators of opposing triangular shape positioned at opposing top corners of the connector.

11. The method of claim 8, wherein each of the plurality of connectors is configured to utilize the Peripheral Component Interconnect Express ("PCIe") interface protocol.

12. The method of claim 8, wherein each of the plurality of connectors comprises a Mini Serial Attached SCSI, High Density ("mini-SAS HD") connector.

13. An apparatus comprising:
a plurality of connectors each supporting an interface protocol allowing two or more individual, adjacent connectors to be utilized together to form a single, increased data width port;
a plurality of visual indicators each associated with one of the plurality of connectors, the visual indicators being driven by an electrical circuit to visually indicate which two or more adjacent connectors of the plurality of connectors are utilized together to form a single, increased data width port; and
a processor configured to:
read interface configuration parameters from a memory of the apparatus;
determine based on the interface configuration parameters whether two or more adjacent connectors of the plurality of connectors are ganged together to form a single, increased data width port; and
if it is determined that two or more adjacent connectors are ganged together to form a single, increased data width port, drive the visual indicators associated with the two or more adjacent connectors through the electrical circuit to indicate that the two or more adjacent connectors are ganged together to form the single, increased data width port.

14. The apparatus of claim 13, wherein the visual indicators associated with a connector comprise two visual indicators positioned on either side of the connector, and wherein indicating which two or more adjacent connectors of the plurality of connectors are utilized together to form the single, increased data width port comprises illuminating the visual indicators encompassing the two or more adjacent connectors.

15. The apparatus of claim 13, wherein the visual indicators associated with each connector comprise two visual indicators of opposing triangular shape.

16. The apparatus of claim 13, further comprising:
a printed circuit board ("PCB") to which the plurality of connectors are connected;
a light-emitting diode ("LED") for each of the visual indicators further connected to the PCB; and
light pipes configured to transmit light from one of the LEDs to a front of an associated connector.

17. The apparatus of claim 13, wherein the apparatus is configured to implement one or more Peripheral Component Interconnect Express ("PCIe") data ports.

18. The apparatus of claim 13, wherein three adjacent connectors are utilized together to provide a single, increased data width port, the visual indicators associated with and encompassing the three adjacent connectors driven by the electrical circuit to indicate a configured data width for the single port formed by the three adjacent connectors being utilized together.

* * * * *